United States Patent
O'Rourke et al.

(10) Patent No.: US 10,956,029 B1
(45) Date of Patent: Mar. 23, 2021

(54) GESTURE-BASED CONTEXT SWITCHING BETWEEN APPLICATIONS

(71) Applicant: Facebook, Inc., Menlo Park, CA (US)

(72) Inventors: Ryan Michael O'Rourke, San Francisco, CA (US); Hemal Shah, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 155 days.

(21) Appl. No.: 16/004,194

(22) Filed: Jun. 8, 2018

(51) Int. Cl.
*G06F 3/0488* (2013.01)
*G06F 9/451* (2018.01)

(52) U.S. Cl.
CPC .......... *G06F 3/04883* (2013.01); *G06F 9/451* (2018.02)

(58) Field of Classification Search
CPC .. G06F 3/04883; G06F 3/0482; G06F 3/0488; G06F 3/04817; G06F 3/04886; G06F 3/0416; G06F 3/0481; G06F 3/04842; G06F 2203/04105; G06F 2203/04803; G06F 3/016; G06F 3/017; G06F 9/451; G06F 2203/04104; G06F 3/04845
See application file for complete search history.

(56) References Cited

U.S. PATENT DOCUMENTS

| | | | | |
|---|---|---|---|---|
| 2013/0055170 A1* | 2/2013 | Langlois | ............... | G06F 1/1626 715/863 |
| 2013/0159941 A1* | 6/2013 | Langlois | ................. | G06F 3/017 715/863 |
| 2014/0218343 A1* | 8/2014 | Hicks | .................. | G06F 3/04883 345/179 |
| 2015/0135108 A1 | 5/2015 | Pope | | |
| 2016/0110047 A1* | 4/2016 | Yoon | ..................... | G06F 3/0488 715/784 |
| 2016/0139798 A1* | 5/2016 | Takikawa | ............... | G01C 21/26 345/173 |
| 2016/0154559 A1* | 6/2016 | Yu | ......................... | G06F 3/0488 715/769 |
| 2017/0245017 A1* | 8/2017 | Chaudhri | ............. | G06F 3/0416 |
| 2017/0371686 A1* | 12/2017 | Shiotani | ................ | G06F 3/1288 |
| 2019/0369842 A1* | 12/2019 | Dolbakian | .......... | G06F 3/04817 |

* cited by examiner

*Primary Examiner* — Tan H Tran

(74) *Attorney, Agent, or Firm* — Baker Botts L.L.P.

(57) ABSTRACT

In one embodiment, a method includes determining, by a first application installed on the client system, that a second application is installed on the client system, wherein the first application is configured to switch contexts to the second application; receiving, by the client system, a context-switching gesture input within a first context of the first application, detecting, by the client system, the context-switching gesture has passed a first threshold within the first context, presenting, by the client system, a preview associated with the second application on a portion of a display of the client system in response to the context-switching gesture passing the first threshold within the first context, detecting, by the client system, the context-switching gesture has passed a second threshold within the first context, and switching contexts to a second context of the second application in response to passing the second threshold.

19 Claims, 5 Drawing Sheets

GESTURE-BASED CONTEXT SWITCHING BETWEEN APPLICATIONS

TECHNICAL FIELD

This disclosure generally relates to user interfaces and user experiences within an application, and in particular relates to switching contexts in applications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

Computing devices typically have numerous applications installed to access various services, including social media accounts, messaging applications, banking services, internet browsers, and other features. Current ways to switch between applications include a process of returning to a home screen, searching for an application to access, and clicking an icon associated with the application to initialize the application.

SUMMARY OF PARTICULAR EMBODIMENTS

In particular embodiments, a client system, such as a smartphone or tablet, may switch contexts between applications through a context-switching gesture. The context-switching gesture may be, for example, a swiping gesture, a tap-and-hold gesture, or another suitable gesture. A user may perform the context-switching gesture within a first context of a first application installed on the client system to switch contexts to a second context of a second application installed on the client system. For example, the context-switching gesture may allow the user to switch from a newsfeed context in a social-networking application to a home-screen context in a messaging application. The client system may detect threshold gestures the user performs to trigger the execution of different functions prior to a context switch. To provide an indication that the user is about to perform a context switch, the client system may present a preview associated with the second application as the user is performing the context-switching gesture. The preview may be presented after the client system detects the user's context-switching gesture reaches a specified threshold. The presentation of a preview may help prevent an accidental gesture that the user did not intend to perform (e.g., the user may not want to switch contexts). For example, if the context-switching gesture is a swipe from right-to-left, the preview may initially be a vertical sliver on the righthand side of the display and progressively become larger as the user continues to perform the context-switching gesture. As the user reaches a specified threshold for context switching, the client system may perform the context switching from the first context of the first application to the second context of the second application.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
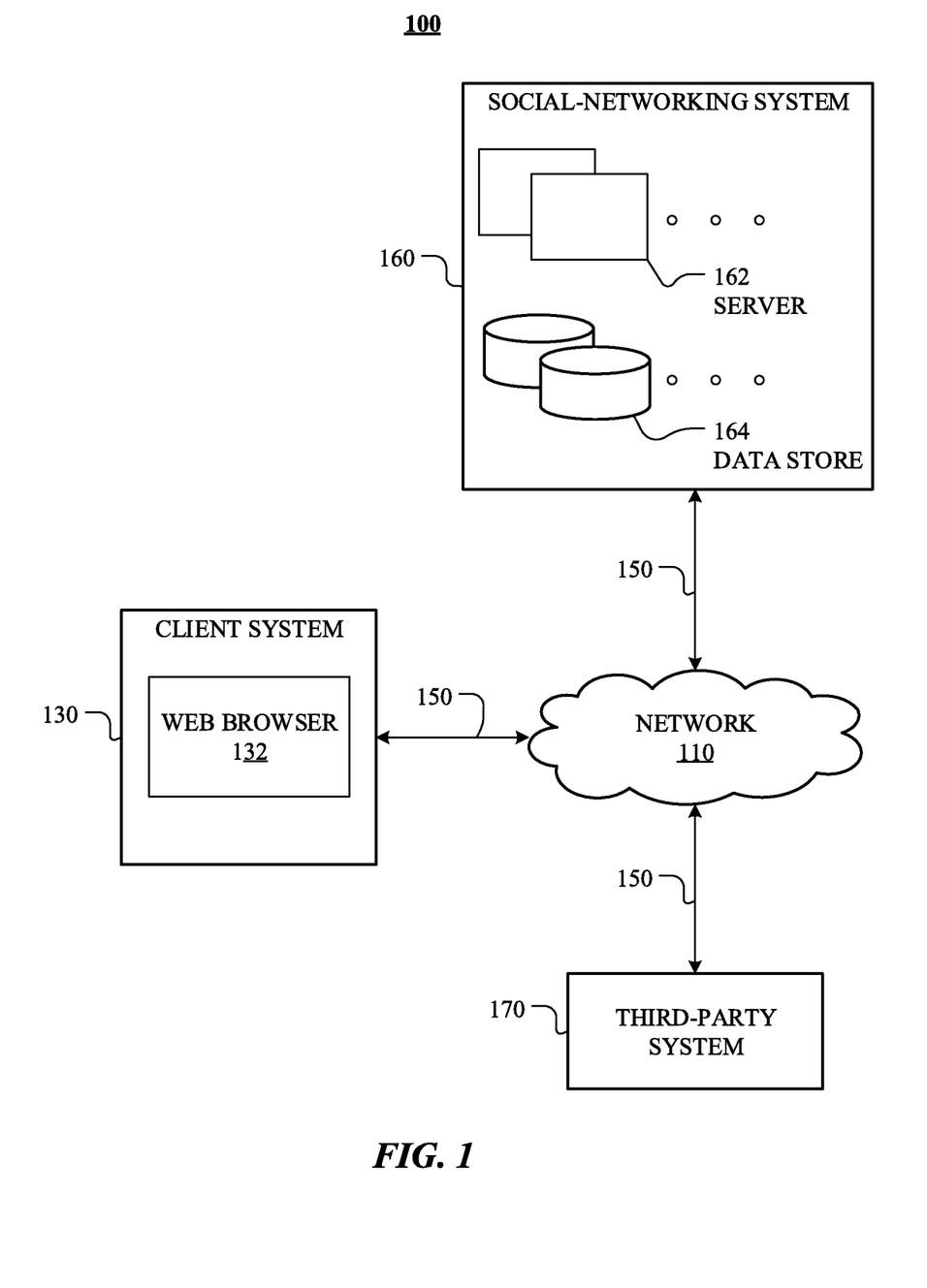
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Gesture-Based Context Switching

In particular embodiments, the client system 130 may switch contexts between applications through a context-switching gesture. In particular embodiments, the context-switching gesture may be an in-app gesture, such as, for example, a swiping gesture, a tap-and-hold gesture, or another suitable gesture. As an example and not by way of limitation, a first application (e.g., a social-networking application) may be installed on a user's client system 130 (e.g., smartphone) and detect that a second application (e.g., a messaging application) is installed on the client system 130. The first application may then provide a gesture-based context-switching functionality within the application, where the user may perform a swiping gesture (or other suitable gesture) in the first application to switch to the second application. By doing so, the user experience is improved by reducing the time spent to access other applications. For instance, to switch between most applications, a user may need to exit out of an application and sift through a number screens/folders of applications in order to select and execute a desired application. The embodiments disclosed herein improve this experience by allowing a context-switching gesture in the first application to be used to open/initiate the second application and take the user to the default context for the second application (e.g., the home screen of a messaging application), or may cause a deep link to be executed and take the user to a particular context within the second application (e.g., a specific message thread in the messaging application). A threshold gesture may be needed before executing the context switch. As an example and not by way of limitation, the user may need to perform a swiping gesture at least a quarter of the way across the screen in order for the application to interpret the swiping gesture as a context-switching gesture to prevent accidental context switches. Furthermore, a preview of the second application may be displayed as the user swipes the first application to the side, such as displaying a color gradient/icon associated with the second app, and/or preview content pulled from the second app. By giving the user a preview of the second application, the user may recognize that the gesture will cause a context switch from the first application to the second application, allowing the user to either continue with the gesture and switch contexts or stop the gesture if they do not want to switch contexts. Although this disclosure describes switching contexts between applications in a particular manner, this disclosure contemplates switching contexts between applications in any suitable manner.

In particular embodiments, the client system 130 may determine that specific applications are installed on the client system 130. The client system 130 identifies particular applications that may be configured to switch contexts between one another. As an example and not by way of limitation, the client system 130 may have a first application that is installed on the client system 130. The first application may be configured to switch contexts to a second application (i.e., a separately installed and executable application from the first application) if it is installed on the client system 130. The client system 130 may use application identifiers to determine that a second application is installed. The first application may be paired with the second application, and the client system 130 may use the first application to determine an application identifier of the first application and find the paired application to the first application. In particular embodiments, the first application may have a list of compatible applications that it may be configured to switch contexts into. In particular embodiments, the first application may be configurable by the user of the client system 130 to switch contexts to a particular context of the second application. As an example and not by way of limitation, the user may configure the first application to switch from a newsfeed context of the first application to a settings-screen context of the second application instead of the home-screen context of the second application. The configurations may be made in a settings section of the first application. In particular embodiments, if the client system 130 determines that the second application is not installed, then the first application may be configured to switch contexts to an install context. As an example and not by way of limitation, the first application may be configured to switch contexts to an app store to download and install the second application. As another example and not by way of limitation, the first application may be configured to switch contexts to a sign up/sign in page for the second application. Although this disclosure describes determining whether specific applications are installed in a particular manner, this disclosure contemplates determining whether specific applications are installed in any suitable manner.

In particular embodiments, the client system 130 may receive a context-switching gesture input within a first context of the first application. The user may perform a gesture on a first screen of the first application, such as, for example, the home screen of the first application. In particular embodiments, the context-switching gesture may be an in-app gesture, such as, for example, a swiping gesture, a tap-and-hold gesture, or another suitable gesture that may be used to switch between contexts. In particular embodiments, the context-switching gesture may be associated with a set of context-switching gestures, where each of the context-switching gesture in the set is associated with a particular section of a particular context and configured to switch between a pair of particular contexts in different applications. As an example and not by way of limitation, the display of a client system 130 within a home screen of a first application may be separated into a top half and a bottom half and performing a context-switching gesture in the top half would switch contexts from the home-screen context of a first application to a home-screen context of a second application. Alternatively, if a context-switching gesture is performed in the bottom half, the context may switch from the home-screen context of the first application to a home-screen context of a third application. The context-switching gesture performed in the bottom half may also be configured to switch to a different context of the second application. In particular embodiments, the client system 130 may receive a different gesture within the first context that is configured to switch contexts to another application. As an example and not by way of limitation, a first gesture, such as, for example, a swiping gesture may be configured to switch contexts from a first application to a second application and a second gesture, such as, for example, a tap-and-hold gesture may be configured to switch contexts from a first application to a third application. Although this disclosure describes receiving a context-switching gesture in a particular manner, this disclosure contemplates receiving a context-switching gesture in any suitable manner.

In particular embodiments, the client system 130 may detect the first context-switching gesture has passed a first threshold within a first context of the first application. As a user is performing a context-switching gesture, the client system 130 may detect when the user has passed a specified threshold. As an example and not by way of limitation, if the context-switching gesture is a swiping gesture, the client system 130 may detect when the user has swiped a threshold distance from an initial position. The client system 130 may also detect when the user has swiped across a fraction of the screen of the display. The user may start from one side of the screen within a first application or in the middle, and the client system 130 will determine when the user has passed a threshold distance. As another example and not by way of limitation, if the context-switching gesture was a tap-and-hold gesture, the client system 130 may determine when the user has held onto the screen for a predetermined time period. In particular embodiments, the threshold may be configurable to adjust the sensitivity of receiving a context-switching gesture. As an example and not by way of limitation, the threshold may be a small distance traveled by the context-switching gesture for the client system 130 to register a context-switching gesture quicker. Although this disclosure describes detecting a context-switching gesture passing a threshold in a particular manner, this disclosure contemplates detecting a context-switching gesture passing a threshold in any suitable manner.

In particular embodiments, the client system 130 may present a preview associated with the second application on a portion of a display of the client system 130 in response to the context-switching gesture passing a threshold within a first context. The client system 130 shows a preview of the second application when the context-switching gesture passes a threshold. As an example and not by way of limitation, when the client system 130 detects a swiping gesture exceeds a threshold distance within the home-screen context of the first application, the client system 130 displays a preview of a second application on a portion of the display. In particular embodiments, the preview may include a color gradient that is associated with the second application. As an example and not by way of limitation, for a particular application, if the application is typically associated with the colors blue and white, then the preview may be a combination of those colors. The preview may also include any designs that represent the application as well. In particular embodiments, the preview may initially be dark and gradually brighten as the user continually performs the context-switching gesture. As an example and not by way of limitation, the brightness may increase linearly from a first brightness (e.g., 30 lumens) to a second brightness (e.g., 100 lumens) where the second brightness may be associated with a second threshold as the user is swiping across the display. In particular embodiments, the size of the preview may gradually increase in size as the user continually performs the context-switching gesture. As an example and not by way of limitation, the preview may initially be a vertical sliver of the righthand side of the display and the portion of the display may gradually increase in size to a quarter of the screen as the user is swiping across the display. In particular embodiments, the client system 130 may detect the context-switching gesture has passed another threshold within the first context of the first application and present an icon associated with the second application within the preview in response to passing the threshold. As an example and not by way of limitation, as the user continues to perform a swiping gesture, the client system 130 may present an icon associated with the second application within the preview of the second application to add another element to the preview to indicate which context the user will switch into. In particular embodiments, the preview may be associated with the context that the context-switching gesture is configured to context switch into. As an example and not by way of limitation, if the context-switching gesture is configured to context switch into a home-screen context of a second application, then the preview may include a home icon to indicate that the user is switching contexts to the home-screen context of the second application. Although this disclosure describes presenting a preview associated with a second application in a particular manner, this disclosure contemplates presenting a preview associated with a second application in any suitable manner.

In particular embodiments, the client system 130 may detect when the context-switching gesture passes a second threshold within the first context of the first application. The client system 130 detects a user performing a context-switching gesture that passes a first threshold and subsequently passing a second threshold. As an example and not by way of limitation, the client system 130 detects when the context-switching gesture passes a threshold distance. In particular embodiments, there may be any number of thresholds within a predetermined distance or predetermined time. As an example and not by way of limitation, within a possible distance to swipe across, the user may exceed any number of thresholds as the user is performing a swiping gesture. Each of these thresholds may trigger the execution of different functions, such as generating a preview or icon. In particular embodiments, if the client system 130 detects the second application is currently not running on the client system 130 (e.g., the user has not initialized the application), then the client system 130 may initialize the application after exceeding a specified gesture threshold. This feature may help to reduce the latency of initializing an inactive application by initializing it in advance (i.e., before the user finishes the gesture). Although this disclosure describes detecting when a context-switching gesture passes a second threshold in a particular manner, this disclosure contemplates detecting when a context-switching gesture passes a second threshold in any suitable manner.

In particular embodiments, the client system 130 may switch contexts to a second context of the second application in response to passing the second threshold gesture. The client system 130 may switch from one application to another in response to detecting the context-switching gesture has exceeded a second threshold gesture. As an example and not by way of limitation, the client system 130 may switch contexts from the first application to the second application after the user performs a swiping gesture across forty-percent of the display. In particular embodiments, the client system 130 may context switch to an activity or process of a system software after the context-switching gesture exceeds a specified gesture threshold. As an example and not by way of limitation, the client system 130 may switch to turning on WI-FI, turning on BLUETOOTH, powering down the client system 130, and other activities/ processes not typically handled by applications (i.e. application software). The context switch to an activity or process of the system software may generate a prompt from the client system 130, which the user may need to confirm in order to complete the context switch. Additionally, the context switch to the activity or process of the system software may be executed via one or more application programming interfaces (APIs) associated with the system software, wherein the APIs are accessible by the application initiating the context switch, and wherein the context switch is permitted by the system software. In particular embodiments, the client system 130 may be configured to determine which context to switch based on a current context. As an example and not by way of limitation, the client system 130 may be configured to context switch from a home-screen context of a first application to a home-screen context of a second application and may be configured to context switch from a settings context of the first application to the settings context of the second application. In particular embodiments, switching contexts to a second context of a second application may include executing a deep link that includes instructions for switching contexts and present the second context of the second application on the display of the client system 130. Although this disclosure describes switching contexts to a second application in a particular manner, this disclosure contemplates switching contexts to a second application in any suitable manner.

In particular embodiments, one or more parameters associated with a context-switching gesture may be configurable within the application. As an example and not by way of limitation, a user may configure specific parameters based on his or her preferences. In particular embodiments, the parameters that may be configured may include a distance traveled by the context-switching gesture, a force of the context-switching gesture, a speed of the context-switching gesture, a length of time the context-switching gesture takes to perform, a location within the application of where the context-switching gesture is performed, a particular context that the context-switching gesture switches to, or a particular preview associated with the context-switching gesture. These parameters may refer to the thresholds associated with the context-switching gesture. As an example and not by way of limitation, a user may configure the distance of a first threshold to be a distance of 10 percent of the screen and the distance of the second threshold to be 30 percent of the screen. Although this disclosure describes configuring parameters associated with a context-switching gesture in a particular manner, this disclosure contemplates configuring parameters associated with a context-switching gesture in any suitable manner.

Figure 2A:
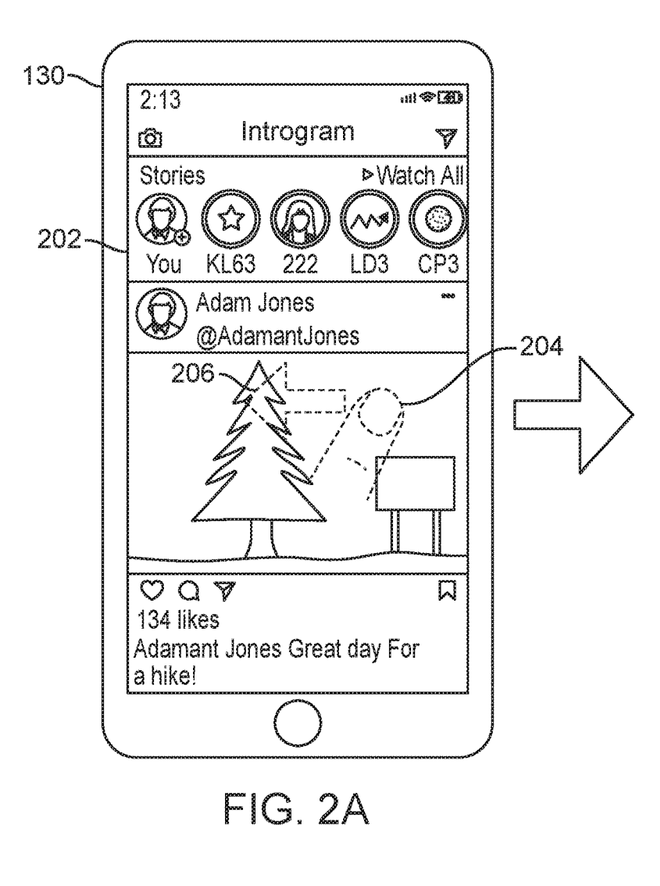
FIGS. 2A-2D illustrate an example of context switching from one application to another application.

FIGS. 2A-2D illustrate an example of context-switching from one context of one application to another context of another application. Referring to FIG. 2A, a client system 130 may initially be in a first context 202 of a first application. As an example and not by way of limitation, the first context 202 may be a newsfeed of a first application. As shown in FIG. 2A, a user may use a touch element 204 (e.g., a user's finger) to interact with the client system 130 through its touch screen I/O interface. The touch element 204 may be suggested to perform a context-switching gesture 206. As an example and not by way of limitation, the context-switching gesture 206 is a swiping gesture within the first context 202 of the first application, such as a swipe from right-to-left gesture. As another example and not by way of limitation, the context-switching gesture 206 may be a tap-and-hold gesture. In particular embodiments, the first context 202 may be divided into several areas to receive a context-switching gesture 206, where performing the context-switching gesture 206 in a particular area results in a different functionality than performing the context-switching gesture 206 in another area. Although shown as initially in a first context 202, the client system 130 may be in another context, where performing the context-switching gesture 206 in the other context would result in a different functionality than performing the context-switching gesture 206 in the first context 202 as described above.

Figure 2B:
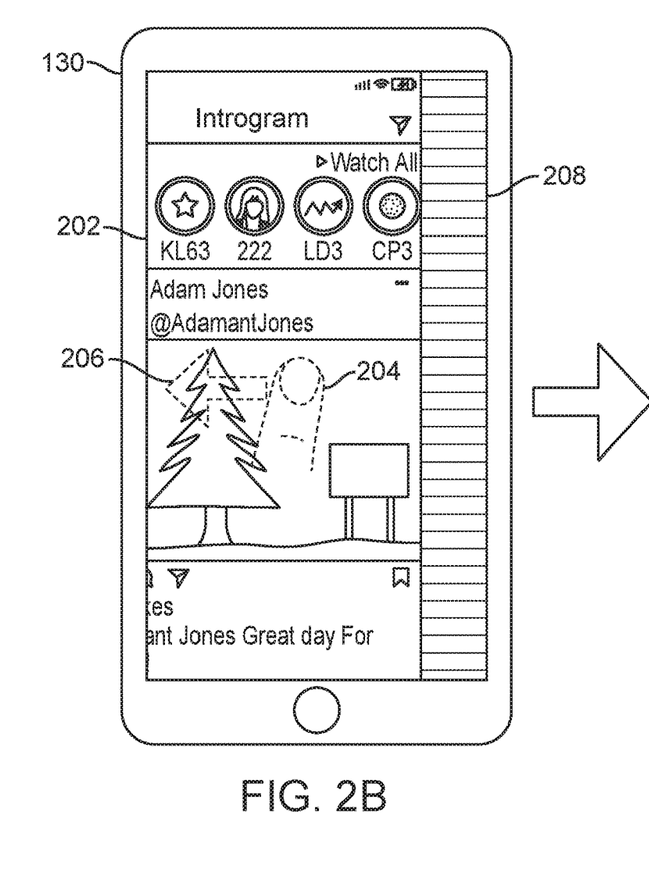

FIG. 2B illustrates the result of performing the context-switching gesture 206 within the first context 202 of the first application. In particular embodiments, after the client system 130 detects that the context-switching gesture 206 exceeds a threshold gesture, a preview 208 may be shown to illustrate the user is switching to another context of another application. As an example and not by way of limitation, the threshold gesture may be performing a swiping gesture across at least ten-percent of the display. As another example and not by way of limitation, the preview 208 may be associated with a second application to illustrate that the user is switching contexts to another application. The association with the second application may be through a color gradient associated with the second application. As an example and not by way of limitation, if the second application is typically represented by a blue and white icon of a paper airplane, then the preview 208 may include the blue and white colors reminiscent of the second application. For example, if the context-switching gesture is a swipe from right-to-left, the preview 208 may initially be a vertical sliver on the righthand side of the display of the client system 130 within the first context 202 of the first application. The preview 208 may gradually increase in size with respect to the context-switching gesture so as the user performs the context-switching gesture (e.g., a swiping motion across the screen). More specifically, the preview may increase in size linearly as the user performs the context-switching gesture. In particular embodiments, the preview 208 may initially be darkened out (darker shades of colors associated with the second application) and gradually increase in brightness as the user performs the context-switching gesture 206. Similarly to the increase in size of the preview 208, the brightness may increase linearly with respect to the context-switching gesture 206. As shown in FIG. 2B, the user may continue performing the context-switching gesture 206 with the touch element 204 within the first context 202 of the first application.

Figure 2C:
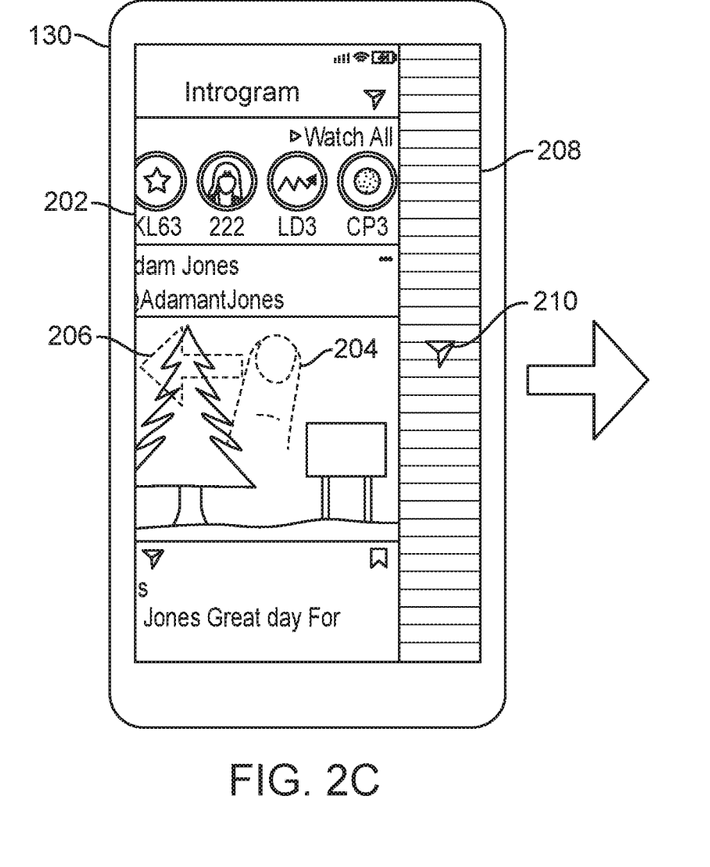

FIG. 2C illustrates the result of continuing to perform the context-switching gesture 206 within the first context 202. In particular embodiments, after the client system 130 detects that the context-switching gesture 206 exceeds another threshold gesture, the client system 130 may display an icon 210 associated with the second application. As an example and not by way of limitation, the threshold gesture may be swiping a distance of about thirty-percent of the display. As described above, the preview 208 may change in brightness and size with respect to continuing to perform the context-switching gesture 206. As shown in FIG. 2C, the user may continue to perform the context-switching gesture 206 within the first context 202 of the first application. Although not shown, the user may also regress in the context-swiping gesture 206. As an example and not by way of limitation, if the user decides to not perform the context-switching gesture (e.g., the user wants to remain in the first context 202) then the user may abandon the context-switching gesture 206 (e.g., by lifting up their finger) or move in the opposite direction to regress so a context switch is not performed. The preview 208 may reduce in size and brightness similarly to how it increased in size and brightness with the context-switching gesture 206.

Figure 2D:
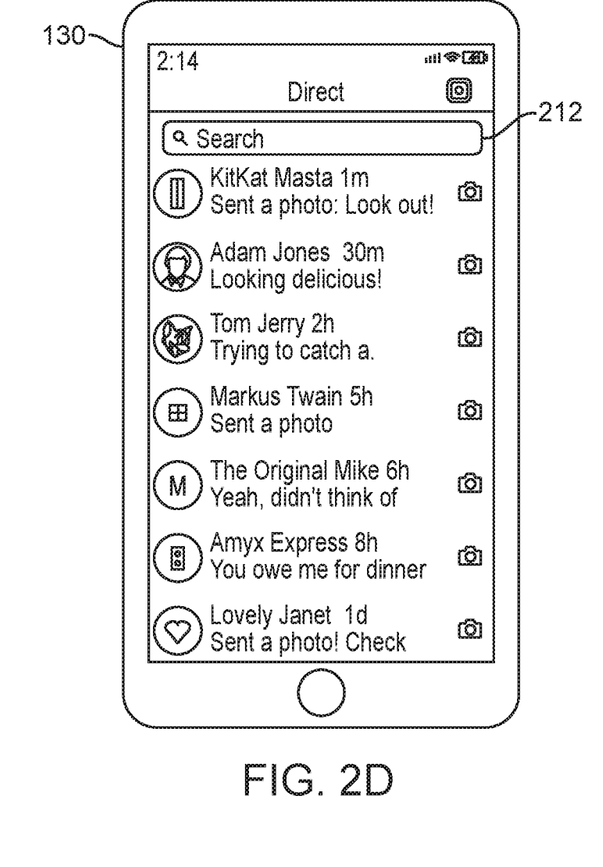

FIG. 2D illustrates the result of continuing to perform the context-switching gesture 206 within the first context 202. In particular embodiments, after the client system 130 detects that the context-switching gesture 206 exceeds another threshold gesture, the client system 130 may perform a context switch from the first context 202 to a second context 212 of another application. As an example and not by way of limitation, after the user continues to perform a swiping gesture across the display within the first context 202, the client system 130 may perform a context switch from the news feed of the first application to a home screen of a second application (e.g., a standalone messaging application). In particular embodiments, the icon 210 may increase in size as the user continues to perform the context-switching gesture 206 before reaching the threshold to switch contexts. In particular embodiments, once the client system 130 detects that the context-switching gesture 206 has reached the threshold to switch contexts, the preview 208 and the icon 210 may stop increasing in size/brightness. In particular embodiments, the client system 130 may automatically perform a context switch once the threshold to switch contexts has been reached. Alternatively, in particular embodiments, the user may need to relinquish his touch element from the display of the client system 130 in order to switch contexts to the second context 212. In particular embodiments, the second context 212 that the client system 130 switches to may be dependent on the first context 202. As described above, in particular embodiments, performing the context-switching gesture 206 in a particular area of the display within the first context 202 may result in a context switch to another application or another context of the second application. Alternatively, instead of switching contexts to another application, the context-switching gesture 206 may be configured to switch to an activity or process as described above. The user may configure one or more parameters of the context-switching gesture 206 as described above. The user may perform the context-switching gesture 206 within the second context 212 of the second application to return to the first context 202 of the first application. Alternatively, the context-switching gesture 206 performed in the second context 212 may result in a context switch to another application. In particular embodiments, the user may perform another context-switching gesture in conjunction with a first context-switching gesture for the client system 130 to perform a context switch. As an example and not by way of limitation, if the context-switching gesture 206 is a tap-and-hold gesture, once the context-switching gesture reaches a threshold gesture (e.g., holding for 3 seconds), the user may perform a swipe gesture to switch contexts from a first context to a second context.

Figure 3:
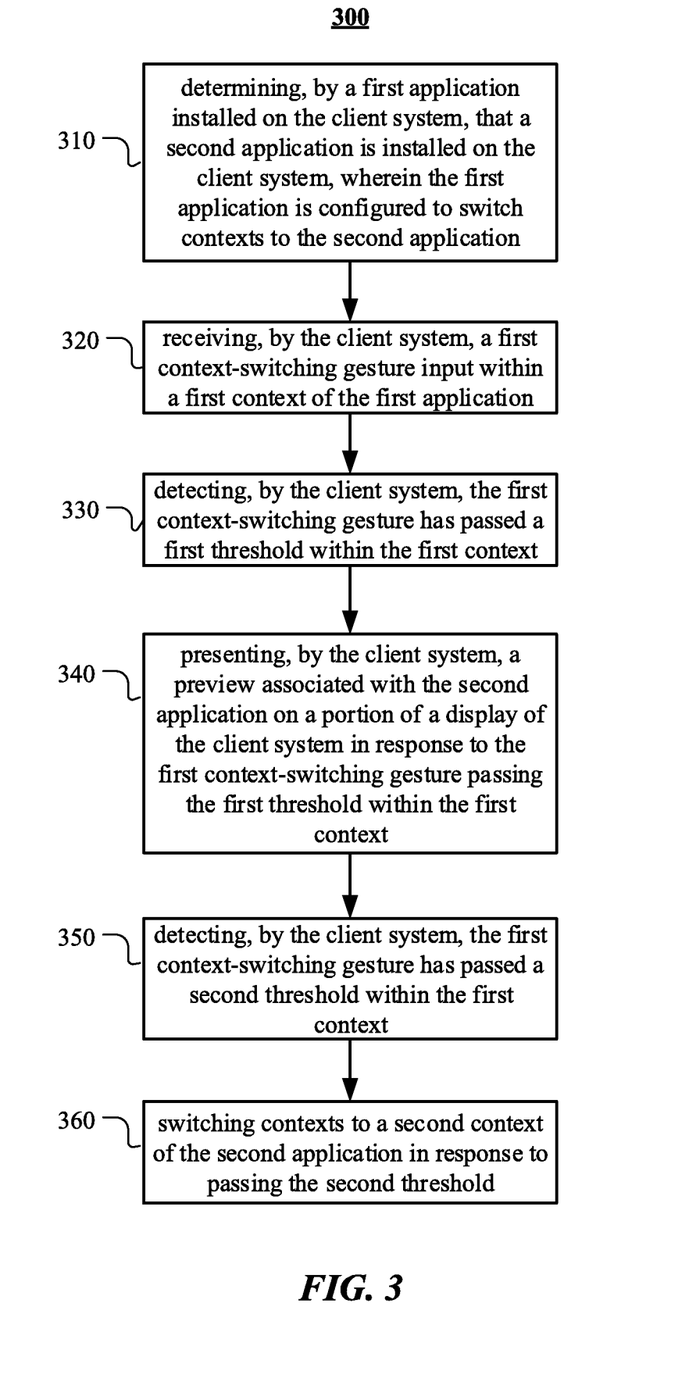
FIG. 3 illustrates an example method for context switching from one application to another application.

FIG. 3 illustrates an example method 300 for performing a context switch from a context of one application to another context of another application. The method may begin at step 310, where the client system 130 may determine, by a first application installed on the client system 130, that a second application is installed on the client system. The first application may be configured to switch contexts to the second application. At step 320, the social-networking system 160 may receive a context-switching gesture input within a first context of the first application. At step 330, the client system 130 may detect the context-switching gesture has passed a first threshold within the first context. At step 340, client system 130 may present a preview associated with the second application on a portion of a display of the client system 130 in response to the context-switching gesture passing the first threshold within the first context. At step 350, the client system 130 may detect the context-switching gesture has passed a second threshold within the first context. At step 360, the client system 130 may switch contexts to a second context of the second application in response to passing the second threshold. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for performing a context switch from a context of one application to another context of another application including the particular steps of the method of FIG. 3, this disclosure contemplates any suitable method for performing a context switch from a context of one application to another context of another application including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, the client system 130 may implement privacy settings set by a user. As an example and not by way of limitation, the client system 130 may request user permissions when initially installing a first application to receive access to determine what applications are installed that the first application may be configured to context switch into. However, if the client system 130 does not have the required permissions, the context-switching feature may be disabled. Although this disclosure describes using particular privacy settings in a particular manner, this disclosure contemplates using any suitable privacy settings in any suitable manner.

Systems and Methods

Figure 4:
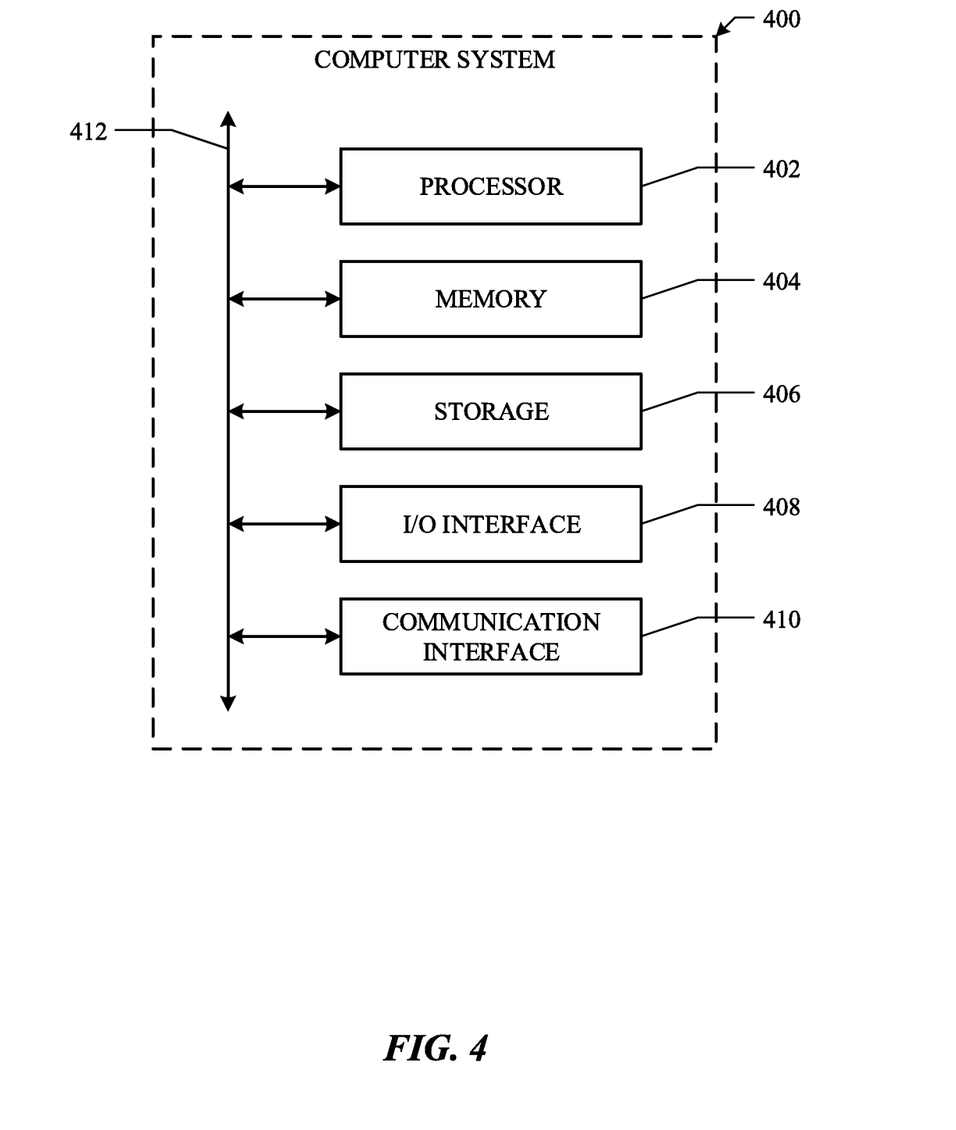
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system:
   determining, by a first application installed on the client system, that a second application is installed on the client system, wherein the first application is configured to switch contexts to the second application, and wherein a first context of the first application is specifically paired to a second context of the second application to perform a context switch;
   receiving, by the client system, a first context-switching gesture input in a first direction within the first context of the first application;
   detecting, by the client system, the first context-switching gesture has passed a first threshold in the first direction within the first context;
   determining, by the client system, the second application is not running on the client system when the first context-switching gesture is received;
   initializing, by the client system, the second application in response to the first context-switching gesture passing the first threshold in the first direction and in response to determining the second application is not running on the client system;
   presenting, by the client system, a preview associated with the second application on a portion of a display of the client system in response to the first context-switching gesture passing the first threshold in the first direction within the first context;
detecting, by the client system, the first context-switching gesture has passed a second threshold in the first direction within the first context; and
switching contexts to the second context of the second application in response to passing the second threshold in the first direction.

2. The method of claim 1, further comprising:
receiving, by the client system, a second context-switching gesture input in a second direction within the first context of the first application;
detecting, by the client system, the second context-switching gesture has passed a third threshold in the second direction within the first context; and
switching contexts to an activity or process performed by the client system.

3. The method of claim 1, wherein if the second application is not installed, then the first application is configured to switch context to an install context.

4. The method of claim 1, further comprising determining which context to switch into based on a current context.

5. The method of claim 1, wherein the first application is configured to switch to a particular context of the second application based on the current context of the first application in which a context-switching gesture is received.

6. The method of claim 1, wherein the preview is associated with the second context of the second application.

7. The method of claim 1, wherein the first application is configurable by a user of the client system to switch contexts to a particular context of the second application.

8. The method of claim 1, wherein switching contexts to the second context of the second application comprises:
executing, by the client system, a deep link comprising instructions for switching contexts to the second context of the second application in response to passing the second threshold gesture; and
presenting, by the client system, the second context of the second application on the display of the client system.

9. The method of claim 1, wherein the first context-switching gesture is a swiping gesture, and wherein the first threshold corresponds to swiping a first distance.

10. The method of claim 1, wherein the preview associated with the second application includes a color gradient associated with the second application, and wherein the preview is initially dark and gradually brightens as the first context-switching gesture approaches the second threshold.

11. The method of claim 1, further comprising:
detecting, by the client system, the first context-switching gesture has passed a third threshold within the first context; and
presenting, by the client system, an icon associated with the second application on the portion of the display of the client system in response to the first context-switching gesture passing the third threshold.

12. The method of claim 1, wherein the preview gradually increases in size as the first context-switching gesture approaches the second threshold.

13. The method of claim 1, wherein the first context-switching gesture is associated with a set of context-switching gestures, each context-switching gesture in the set being associated with a particular section of a particular context, wherein each context-switching gesture in the set is configured to switch between a pair of particular contexts in different applications.

14. The method of claim 1, wherein one or more parameters associated with the first context-switching gesture are configured within the first application.

15. The method of claim 14, wherein the one or more parameters comprise one or more of:
a distance traveled by the first context-switching gesture,
a force of the first context-switching gesture,
a speed of the first context-switching gesture,
a length of time the first context-switching gesture takes to perform,
a location within the first application of where the first context-switching gesture is performed,
a particular context that the first context-switching gesture switches to, or
a particular preview associated with the first context-switching gesture.

16. The method of claim 14, wherein the one or more parameters comprise a first gesture distance associated with the first threshold and a second gesture distance associated with the second threshold.

17. The method of claim 1, further comprising:
receiving, by the client system, instructions to configure the first application to switch contexts to the second application, wherein the user input is indicative of the link of the first context of the first application to the second context of the second application; and
storing, by the client system, the link in a list of compatible applications.

18. One or more computer-readable non-transitory storage media embodying software that is operable when executed by a client system to:
determine, by a first application installed on the client system, that a second application is installed on the client system, wherein the first application is configured to switch contexts to the second application, and wherein a first context of the first application is specifically paired to a second context of the second application to perform a context switch;
receive a first context-switching gesture input in a first direction within the first context of the first application;
detect the first context-switching gesture has passed a first threshold in the first direction within the first context;
determine the second application is not running on the client system when the first context-switching gesture is received;
initialize the second application in response to the first context-switching gesture passing the first threshold in the first direction and in response to determining the second application is not running on the client system;
present a preview associated with the second application on a portion of a display of the client system in response to the first context-switching gesture passing the first threshold in the first direction within the first context;
detect the first context-switching gesture has passed a second threshold in the first direction within the first context; and
switch contexts to the second context of the second application in response to passing the second threshold in the first direction.

19. A client system comprising: one or more processors; and a non-transitory memory coupled to the processors comprising instructions executable by the processors, the processors operable when executing the instructions to:
determine, by a first application installed on the client system, that a second application is installed on the client system, wherein the first application is configured to switch contexts to the second application, and wherein a first context of the first application is specifically paired to a second context of the second application to perform a context switch;

receive a first context-switching gesture input in a first direction within the first context of the first application;

detect the first context-switching gesture has passed a first threshold in the first direction within the first context;

determine the second application is not running on the client system when the first context-switching gesture is received;

initialize the second application in response to the first context-switching gesture passing the first threshold in the first direction and in response to determining the second application is not running on the client system;

present a preview associated with the second application on a portion of a display of the client system in response to the first context-switching gesture passing the first threshold in the first direction within the first context;

detect the first context-switching gesture has passed a second threshold in the first direction within the first context; and switch contexts to the second context of the second application in response to passing the second threshold in the first direction.

* * * * *